(12) United States Patent
Shishihara et al.

(10) Patent No.: US 10,180,161 B2
(45) Date of Patent: Jan. 15, 2019

(54) TAPERED ROLLER BEARING

(71) Applicant: JTEKT CORPORATION, Osaka-shi, Osaka (JP)

(72) Inventors: Yuki Shishihara, Kashiwara (JP); Shigeo Kamamoto, Kashiwara (JP); Junji Murata, Kashiba (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 15/810,850

(22) Filed: Nov. 13, 2017

(65) Prior Publication Data
US 2018/0135693 A1   May 17, 2018

(30) Foreign Application Priority Data
Nov. 17, 2016   (JP) .................................. 2016-223949

(51) Int. Cl.
*F16C 33/36* (2006.01)
*F16C 33/46* (2006.01)
*F16C 19/36* (2006.01)
*F16C 33/58* (2006.01)

(52) U.S. Cl.
CPC ........ *F16C 19/364* (2013.01); *F16C 33/4605* (2013.01); *F16C 33/4635* (2013.01); *F16C 33/4676* (2013.01); *F16C 33/585* (2013.01); *F16C 2300/02* (2013.01)

(58) Field of Classification Search
CPC .. F16C 19/364; F16C 19/368; F16C 33/4605; F16C 33/4635; F16C 33/4676; F16C 33/4682
See application file for complete search history.

(56) References Cited

U.S. PATENT DOCUMENTS

| | | | | |
|---|---|---|---|---|
| 3,477,773 A * | 11/1969 | Altson | .................. | F16C 19/364 384/576 |
| 2015/0176648 A1* | 6/2015 | Okamoto | ............ | F16C 33/6681 384/571 |
| 2015/0252848 A1* | 9/2015 | Suzuki | .................... | F16C 19/49 384/571 |
| 2017/0307015 A1 | 10/2017 | Kamamoto et al. | | |

FOREIGN PATENT DOCUMENTS

| | | | | |
|---|---|---|---|---|
| DE | 102008020069 A1 * | 10/2009 | .......... | F16C 33/4635 |
| JP | 2004-076766 A | 3/2004 | | |
| JP | 2016-089851 A | 5/2016 | | |

* cited by examiner

*Primary Examiner* — Phillip A Johnson
(74) *Attorney, Agent, or Firm* — Oliff PLC

(57) ABSTRACT

A tapered roller bearing includes an inner ring, an outer ring, a plurality of tapered rollers, and an annular cage that holds the tapered rollers. The cage has a small annular portion positioned on one side, in the axial direction, of the tapered rollers, a large annular portion positioned on the other side, in the axial direction, of the tapered rollers, and a plurality of cage bars that couple the small annular portion and the large annular portion to each other. The cage bars each have a cage bar end portion that is positioned between the large annular portion and a large rib and that projects toward the other side in the axial direction with respect to large end surfaces of the tapered rollers.

6 Claims, 6 Drawing Sheets

TAPERED ROLLER BEARING

INCORPORATION BY REFERENCE

The disclosure of Japanese Patent Application No. 2016-223949 filed on Nov. 17, 2016 including the specification, drawings and abstract, is incorporated herein by reference in its entirety.

BACKGROUND OF THE INVENTION

1. Field of the Invention

The present invention relates to a tapered roller bearing.

2. Description of the Related Art

A tapered roller bearing is widely used in various machines, and used in transmission devices and differential devices of automobiles, various construction machines, and so forth, for example. In the case of the transmission devices and the differential devices, lubricating oil (oil) is stored in a housing of such devices. The lubricating oil is occasionally used to lubricate gears and bearings.

The tapered roller bearing includes an inner ring that has a conical inner raceway surface, an outer ring that has a conical outer raceway surface, a plurality of tapered rollers, and an annular cage. The tapered rollers are provided between the inner raceway surface and the outer raceway surface. The cage holds the plurality of tapered rollers. The cage has a predetermined shape obtained by pressing a plate member made of steel, for example. In such a tapered roller bearing, lubricating oil flows inside the bearing from one side in the axial direction toward the other side (see Japanese Patent Application Publication No. 2004-076766 (JP 2004-076766 A), for example).

The lubricating oil stored in the housing described above contains a relatively large amount of foreign matter such as abrasion powder (iron powder) of the gears. Therefore, the foreign matter enters the inside of the tapered roller bearing together with the lubricating oil, and the foreign matter is caught between the inner ring or the outer ring and the tapered rollers. This may cause flaking on the raceway surface of the inner ring or the outer ring, rolling surfaces of the tapered rollers, and so forth, reducing the life of the tapered roller bearing.

SUMMARY OF THE INVENTION

An object of the present invention is to provide a tapered roller bearing that is capable of suppressing entry of foreign matter into the inside of the bearing together with lubricating oil.

An aspect of the present invention provides a tapered roller bearing including: an inner ring that has a conical inner raceway surface provided on an outer peripheral side of the inner ring and expanded in diameter from one side in an axial direction toward the other side and a large rib provided on the other side in the axial direction to project toward an outer side in a radial direction; an outer ring that has a conical outer raceway surface provided on an inner peripheral side of the outer ring and expanded in diameter from one side in the axial direction toward the other side; a plurality of tapered rollers provided between the inner ring and the outer ring to roll on the inner raceway surface and the outer raceway surface; and an annular cage that holds the plurality of tapered rollers, in which: the cage has a small annular portion positioned on one side, in the axial direction, of the tapered rollers, a large annular portion positioned on the other side, in the axial direction, of the tapered rollers, and a plurality of cage bars that couple the small annular portion and the large annular portion to each other; and the cage bars each have a cage bar end portion that is positioned between the large annular portion and the large rib and that projects toward the other side in the axial direction with respect to large end surfaces of the tapered rollers.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
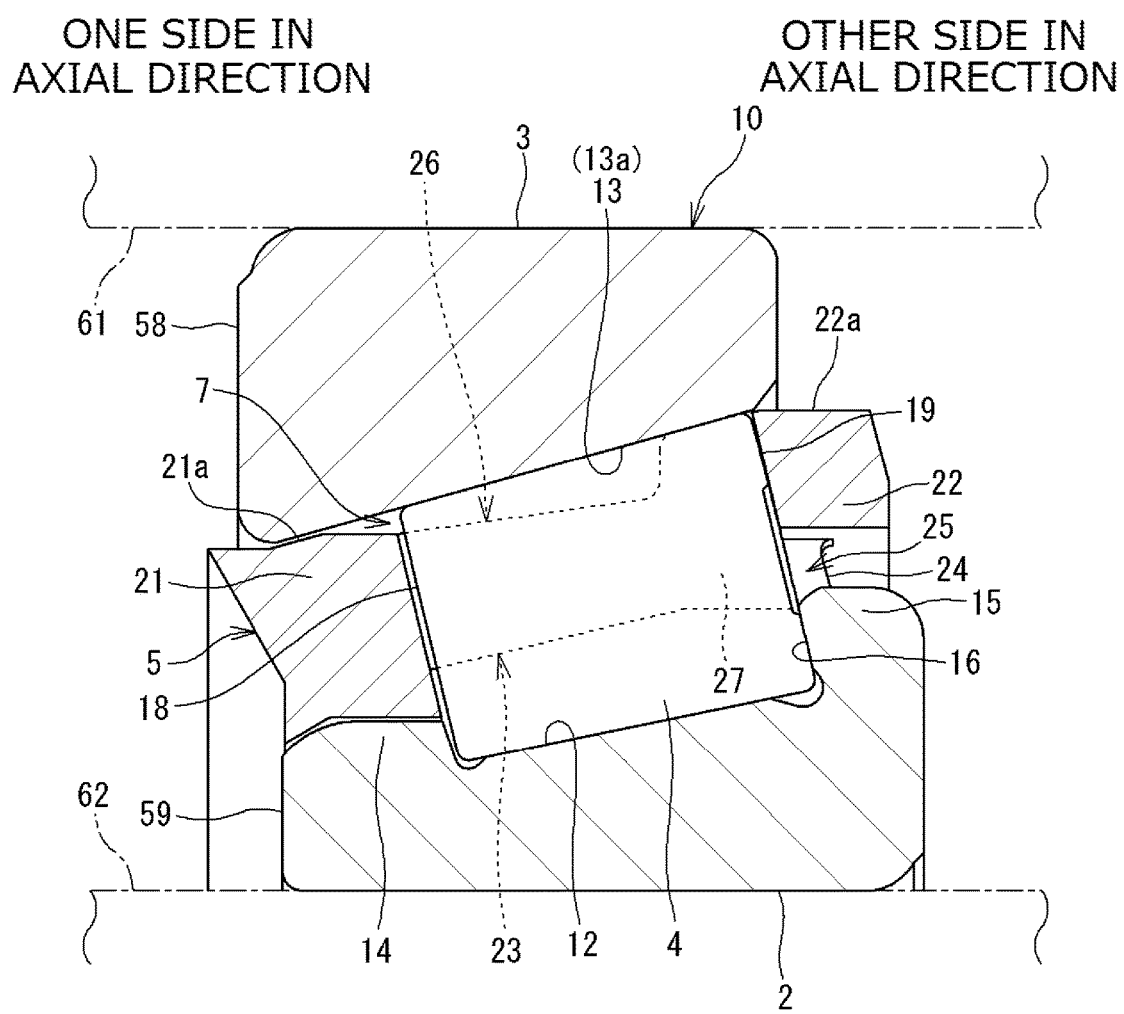
FIG. 1 is a sectional view illustrating a tapered roller bearing according to an embodiment.

An embodiment of the present invention will be described below with reference to the drawings. FIG. 1 is a sectional view illustrating a tapered roller bearing according to an embodiment. A tapered roller bearing 10 is used in transmission devices and differential devices of automobiles, various construction machines, and so forth, for example. The tapered roller bearing 10 supports a shaft 62 that rotates in a housing 61. Lubricating oil (oil) is stored in the housing 61. The lubricating oil is used to lubricate the tapered roller bearing 10. The tapered roller bearing 10 to be described below may be for other usage.

The tapered roller bearing 10 includes an inner ring 2, an outer ring 3, a plurality of tapered rollers 4, and a cage 5. The inner ring 2, the outer ring 3, and the cage 5 are annular members centered on a common axis.

The inner ring 2 is formed using bearing steel, steel for mechanical structures, or the like. An inner raceway surface 12 on which the plurality of tapered rollers 4 roll is provided on the outer peripheral side of the inner ring 2. The inner raceway surface 12 has a conical shape (tapered shape) in which the inner raceway surface 12 is expanded in diameter from one side (left side in FIG. 1) in the axial direction toward the other side (right side in FIG. 1) in the axial direction. The inner ring 2 has a cone front face rib (hereinafter referred to as a small rib) 14 and a cone back face rib (hereinafter referred to as a large rib) 15. The small rib 14 is provided on one side, in the axial direction, of the inner raceway surface 12, and projects toward the outer side in the radial direction. The large rib 15 is provided on the other side, in the axial direction, of the inner raceway surface 12, and projects toward the outer side in the radial direction. The large rib 15 is larger in outside diameter than the small rib 14.

The outer ring 3 is formed using bearing steel, steel for mechanical structures, or the like. An outer raceway surface 13 on which the plurality of tapered rollers 4 roll and which faces the inner raceway surface 12 is provided on the inner peripheral side of the outer ring 3. The outer raceway surface 13 has a conical shape (tapered shape) in which the outer raceway surface 13 is expanded in diameter from one side in the axial direction toward the other side in the axial direction.

The tapered rollers 4 are members formed using bearing steel or the like, and each have a small end surface 18 with a small diameter on one side in the axial direction and a large end surface 19 with a large diameter on the other side in the axial direction. The tapered rollers 4 are provided in an annular space 7 formed between the inner ring 2 and the outer ring 3, and can roll on the inner raceway surface 12 and the outer raceway surface 13. The large end surfaces 19 contact a rib surface (side surface) 16 of the large rib 15 of the inner ring 2. When the tapered roller bearing 10 (in the embodiment, the inner ring 2) is rotated, the large end surfaces 19 and the rib surface 16 make sliding contact with each other.

The cage 5 is provided between the inner ring 2 and the outer ring 3 together with the plurality of tapered rollers 4, and holds the plurality of tapered rollers 4. The cage 5 has an annular shape as a whole, and has a small annular portion 21 that is annular, a large annular portion 22 that is annular, and a plurality of cage bars 23. The small annular portion 21 is positioned on one side, in the axial direction, of the tapered rollers 4, and positioned on the outer side, in the radial direction, of the small rib 14 of the inner ring 2. The large annular portion 22 is positioned on the other side, in the axial direction, of the tapered rollers 4, and positioned on the outer side, in the radial direction, of the large rib 15 of the inner ring 2. The cage bars 23 couple the small annular portion 21 and the large annular portion 22 to each other. The large annular portion 22 is larger in outside diameter than the small annular portion 21. In the embodiment, the large annular portion 22 is larger also in inside diameter. The plurality of cage bars 23 are provided at intervals in the circumferential direction. Spaces formed between the small annular portion 21 and the large annular portion 22 and between two cage bars 23 that are adjacent to each other in the circumferential direction serve as pockets 26 that accommodate (hold) the tapered rollers 4. The term "circumferential direction" refers to a direction about the axis of the tapered roller bearing 10.

The cage 5 can make sliding contact with an inner peripheral surface 13a (outer raceway surface 13) of the outer ring 3. Rotation of the cage 5 is guided by the outer ring 3. That is, the tapered roller bearing 10 according to the embodiment is a bearing of an outer ring guide type in which the cage 5 is guided by the outer ring 3. The cage 5 is made of a thermoplastic resin (made of a synthetic resin), and formed by injection molding.

In the tapered roller bearing 10 configured as described above, when the bearing (inner ring 2) is rotated, a pumping action that causes lubricating oil to flow from one side in the axial direction toward the other side in the axial direction is generated. The mechanism of such generation is as follows. Lubricating oil and air that is present in the annular space 7 has a force component directed toward the outer side in the radial direction based on a centrifugal force due to rotation of the bearing. As described above, the outer raceway surface 13 of the outer ring 3 has a conical shape. Consequently, lubricating oil and air in the annular space 7 flows toward the other side in the axial direction along the outer raceway surface 13. When this flow is generated, an action that suctions lubricating oil and air that is present outside the bearing on one side in the axial direction is generated. Consequently, a pumping action that causes lubricating oil to flow from one side in the axial direction toward the other side in the axial direction is generated in the tapered roller bearing 10.

Figure 2:
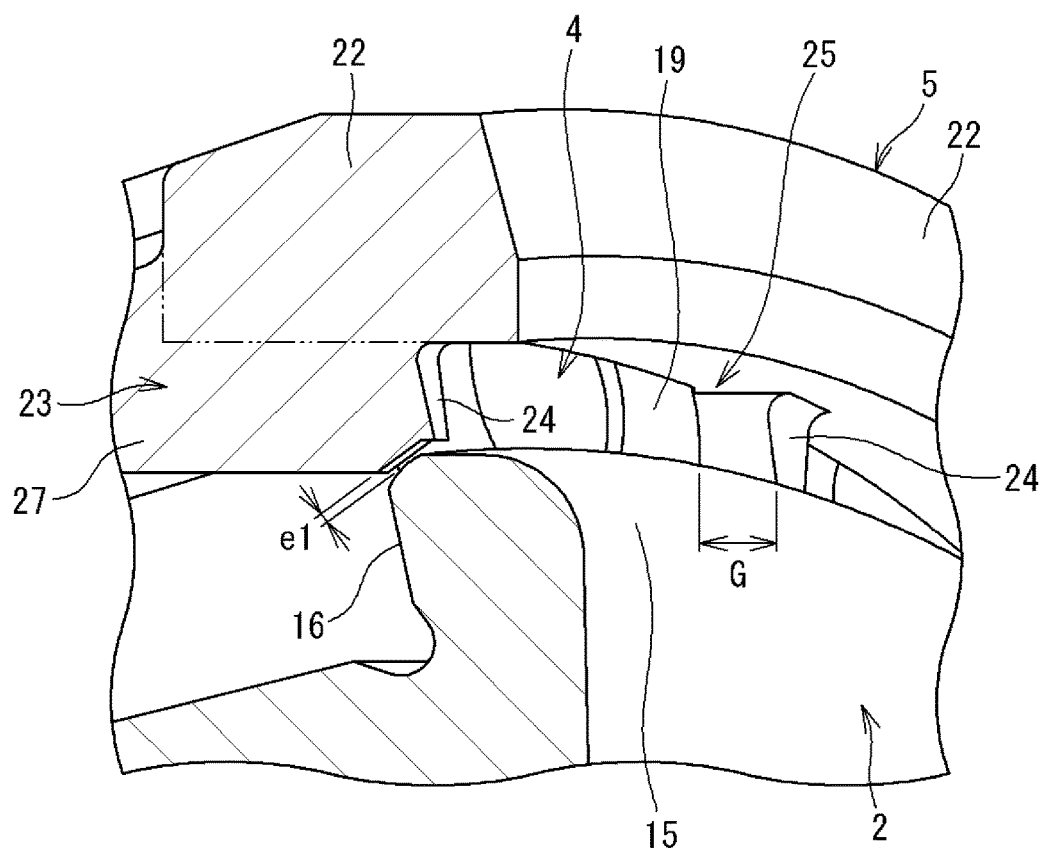
FIG. 2 is a perspective view illustrating the tapered roller bearing on the other side in the axial direction.

FIG. 2 is a perspective view illustrating the tapered roller bearing 10 illustrated in FIG. 1 on the other side in the axial direction, and illustrates a portion between the large rib 15 of the inner ring 2 and the large annular portion 22 of the cage 5. As illustrated in FIGS. 1 and 2, the cage bars 23 of the cage 5 each have a cage bar body portion 27 that faces the outer peripheral surface of the tapered roller 4, and a cage bar end portion 24 provided to extend from the cage bar body portion 27 toward the other side in the axial direction. The cage bar end portion 24 projects toward the other side in the axial direction with respect to the large end surface 19 of the tapered roller 4. That is, the cage bar end portion 24 is provided to extend from the cage bar body portion 27 to a position on the inner peripheral side of the large annular portion 22, and positioned between the large annular portion 22 and the large rib 15. In FIG. 2, the boundary between the large annular portion 22 and the cage bar 23 is indicated by the long dashed double-short dashed line.

The amount of projection, in the axial direction, of the cage bar end portion 24 from the large end surface 19 of the tapered roller 4 may be small. The amount of projection G (dimension of projection G in the axial direction) may be more than 0.5 millimeters and less than 1 millimeter, for example.

In the tapered roller bearing 10 with this configuration, a small space 25 that can accommodate lubricating oil (oil) is formed between the large annular portion 22 and the large rib 15 and between cage bar end portions 24 and 24 that are adjacent to each other in the circumferential direction. The small space 25 is formed on the other side, in the axial direction, of each of the plurality of tapered rollers 4. A plurality of such small spaces 25 are present along the circumferential direction. When the tapered roller bearing 10 is rotated and the cage 5 is rotated in the same direction, lubricating oil in each of the small spaces 25 is also rotated, and the lubricating oil flows in the circumferential direction between the large annular portion 22 and the large rib 15 to form an oil curtain. With the oil curtain, it is possible to suppress entry of foreign matter such as abrasion powder (iron powder) that is present on the other side in the axial direction into the inside of the bearing from a space between the large annular portion 22 and the large rib 15.

In the tapered roller bearing 10 (see FIG. 1), in particular, as described above, the large rib 15 (rib surface 16) and the tapered rollers 4 (large end surfaces 19) make sliding contact with each other. Consequently, while entry of foreign matter such as that described above between the large rib 15 and the tapered rollers 4 tends to cause damage, it is possible to prevent such damage by suppressing entry of foreign matter using the oil curtain.

For the pumping action, the other side, in the axial direction, of the annular space 7 which is formed between the inner ring 2 and the outer ring 3 corresponds to the side of the exit for lubricating oil. Thus, when a pumping action is generated, it is more unlikely for foreign matter to enter the inside of the bearing (annular space 7) from the outside on the other side in the axial direction. The tapered roller bearing 10 according to the embodiment includes an additional unit configured to suppress entry of foreign matter into the inside of the bearing. Such a unit will be described below.

Figure 3:
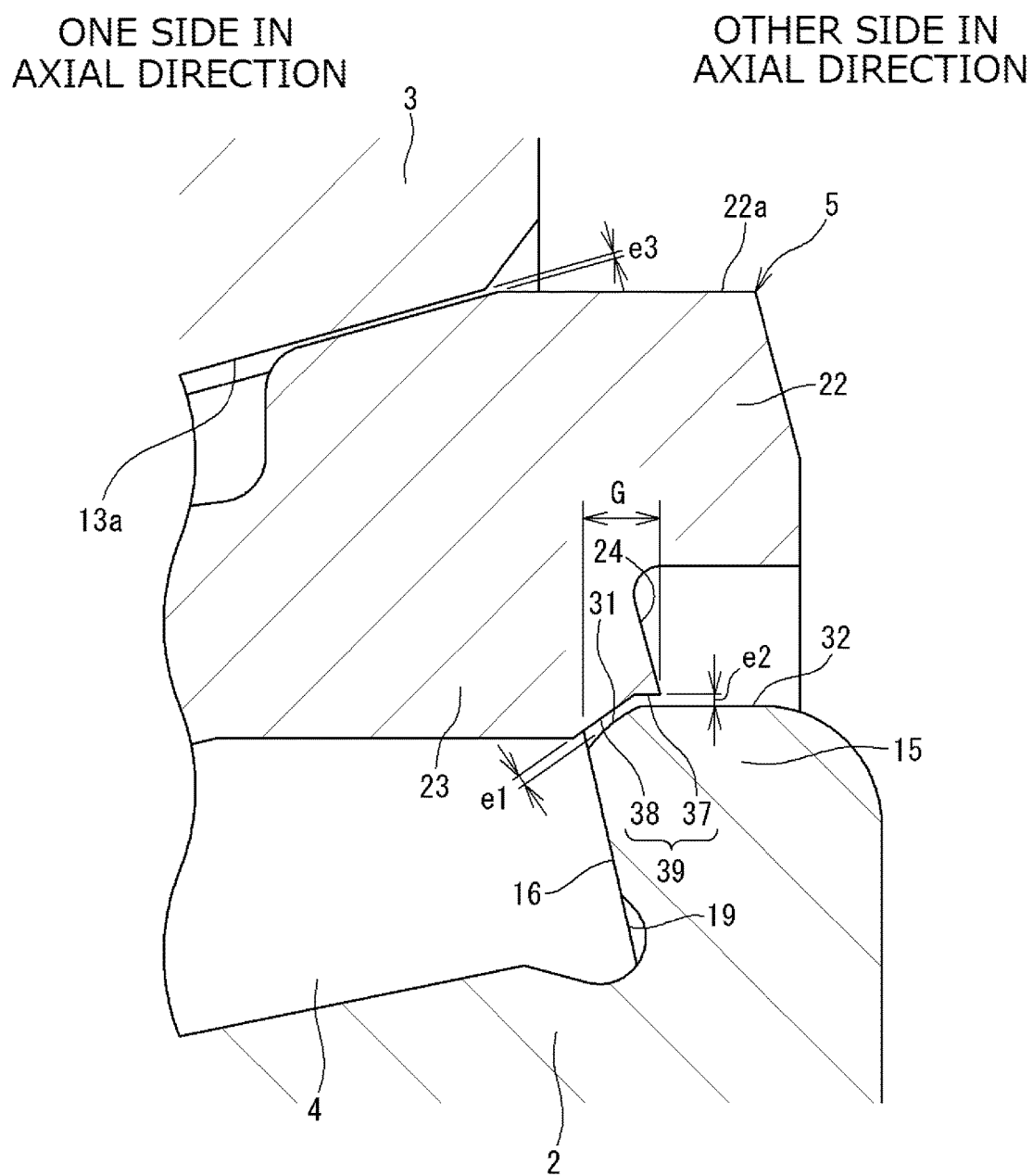
FIG. 3 is a sectional view illustrating a portion of an inner ring and an outer ring on the other side in the axial direction and a large annular portion of a cage.

FIG. 3 is a sectional view illustrating a portion of the inner ring 2 and the outer ring 3 on the other side in the axial direction and the large annular portion 22 of the cage 5. The large rib 15 of the inner ring 2 has the rib surface 16, a convex curved surface portion (large diameter-side convex curved surface portion) 31 that is continuous with the outer side, in the radial direction, of the rib surface 16, and an outer peripheral surface 32 of the large rib 15 connected to the convex curved surface portion 31. In contrast, the cage bar end portion 24 of the cage bar 23 of the cage 5 has a facing surface (large-diameter facing surface) 39 provided on the inner side, in the radial direction, of the cage bar end portion 24 to face the convex curved surface portion 31 and a part of the outer peripheral surface 32. The facing surface 39 has an inclined surface (tapered surface) 38 that faces the convex curved surface portion 31. A first minute gap e1 is formed between the convex curved surface portion 31 and the inclined surface 38. The facing surface 39 has a cylindrical surface 37 that is connected to the inclined surface 38 at a bending angle and that faces a part of the outer peripheral surface 32 of the large rib 15. A second minute gap e2 is formed between the cylindrical surface 37 and a part of the outer peripheral surface 32.

Either of the first minute gap e1 and the second minute gap e2 may be narrower. In the embodiment, the first minute gap e1 is narrower than the second minute gap e2, and the first minute gap e1 is set to be less than 0.25 millimeters. The dimension (less than 0.25 millimeters) of the minute gap e1 indicates the minimum dimension of the gap between the convex curved surface portion 31 and the inclined surface 38. The minute gaps e1 and e2 constitute a bent labyrinth gap.

In this way, minute gaps (e1 and e2) are formed between the cage bar end portion 24 of the cage 5 and the large rib 15 of the inner ring 2 on the other side, in the axial direction, of the tapered roller bearing 10. Consequently, even if foreign matter is contained in lubricating oil that is present in the small space 25 (see FIG. 2), entry of such foreign matter from a space between the cage bar end portion 24 and the large rib 15 can be suppressed.

In FIG. 3, one side (left side in FIG. 3), in the axial direction, of an outer peripheral surface 22a of the large annular portion 22 faces the inner peripheral surface 13a of the outer ring 3. A third minute gap e3 is formed between the large annular portion 22 and the outer ring 3. The minute gap e3 is set to be less than 0.5 millimeters, for example. The dimension (less than 0.5 millimeters) of the minute gap e3 indicates the minimum dimension of the gap between the large annular portion 22 and the outer ring 3. With the minute gap e3, entry of foreign matter from a space between the large annular portion 22 and the outer ring 3 can also be suppressed.

Figure 4:
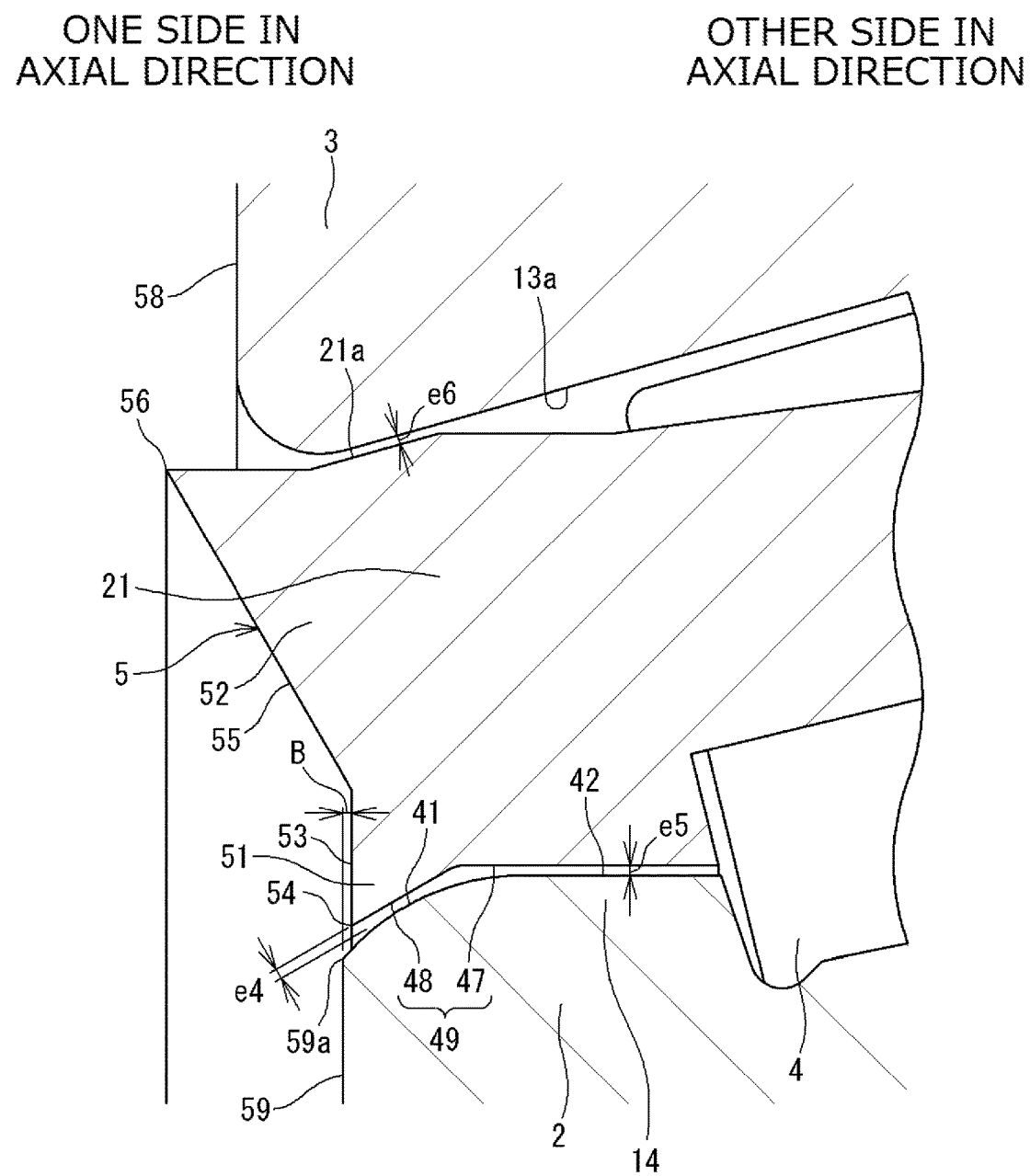
FIG. 4 is a sectional view illustrating a portion of the inner ring and the outer ring on one side in the axial direction and a small annular portion of the cage.

FIG. 4 is a sectional view illustrating a portion of the inner ring 2 and the outer ring 3 on one side in the axial direction and the small annular portion 21 of the cage 5. The small rib 14 of the inner ring 2 has a side surface 59 on one side in the axial direction, a convex curved surface portion (small diameter-side convex curved surface portion) 41 that is continuous with the outer side, in the radial direction, of the side surface 59, and an outer peripheral surface 42 of the small rib 14 connected to the convex curved surface portion 41. In contrast, the small annular portion 21 of the cage 5 has a facing surface (small-diameter facing surface) 49 provided on the inner side, in the radial direction, of the small annular portion 21 to face the convex curved surface portion 41 and the outer peripheral surface 42. The facing surface 49 has an inclined surface (tapered surface) 48 that faces the convex curved surface portion 41. A fourth minute gap e4 is formed between the convex curved surface portion 41 and the inclined surface 48. The facing surface 49 has a cylindrical surface 47 that is connected to the inclined surface 48 with a bending angle and that faces the outer peripheral surface 42 of the small rib 14. A fifth minute gap e5 is formed between the cylindrical surface 47 and the outer peripheral surface 42. Either of the fourth minute gap e4 and the fifth minute gap e5 may be narrower. The minute gaps e4 and e5 are set to be less than 0.2 millimeters. The dimension (less than 0.2 millimeters) of the minute gaps e4 and e5 indicates the minimum dimension of the gap between the two surfaces. The minute gaps e4 and e5 constitute a bent labyrinth gap.

In FIG. 4, an outer peripheral surface 21a of the small annular portion 21 of the cage 5 faces the inner peripheral surface 13a of the outer ring 3. A sixth minute gap e6 is formed between the small annular portion 21 and the outer ring 3. The minute gap e6 is set to be less than 0.5 millimeters, for example. The dimension (less than 0.5 millimeters) of the minute gap e6 indicates the minimum dimension of the gap between the small annular portion 21 and the outer ring 3.

In this way, the minute gaps e4 and e5 are formed between the inner ring 2 and the small annular portion 21 of the cage 5, and the minute gap e6 is formed between the outer ring 3 and the small annular portion 21. Consequently, it is possible to block a space on one side, in the axial direction, of the annular space 7 which is formed between the inner ring 2 and the outer ring 3 with the small annular portion 21 (in spite of the presence of the minute gaps e4, e5, and e6). Consequently, entry of foreign matter that is present outside on one side in the axial direction into the inside of the bearing together with lubricating oil can be suppressed even when the pumping action described above is generated.

In FIG. 4, the small annular portion 21 of the cage 5 has an inner peripheral side portion 51 on the inner side in the radial direction and an outer peripheral side portion 52 on the outer side in the radial direction. An inner peripheral end 54 on a side surface 53 on one side, in the axial direction, of the inner peripheral side portion 51 has an angular shape, and is positioned on the other side (annular space 7 side), in the axial direction with respect to the side surface 59 on one side in the axial direction, of the inner ring 2. In the case where the side surface 59 of the inner ring 2 is used as a reference, an axial distance B from the side surface 59 to the side surface 53 (inner peripheral end 54) of the inner peripheral side portion 51 is set to a positive value. In the embodiment, the axial distance B is set to 0.2 millimeters. In FIG. 4, the side surface 53 (inner peripheral end 54) of the inner peripheral side portion 51 is positioned on the other side in the axial direction with respect to the side surface 59 of the inner ring 2. However, the side surfaces 53 and 59 may be at the same position in the axial direction. That is, the axial distance B may be set to 0 or more, preferably 0 or more and less than 0.2 millimeters.

With this configuration, entry of lubricating oil from a space between the inner ring 2 (small rib 14) and the small annular portion 21 of the cage 5 can be effectively suppressed. That is, when the tapered roller bearing 10 (inner ring 2) is rotated, lubricating oil that is present on one side, in the axial direction, of the inner ring 2 flows toward the outer side in the radial direction because of a centrifugal force, and flows along the side surface 59 of the inner ring 2. As described above, the axial distance B is set to a positive value (or zero), and the inner peripheral side portion 51 of the small annular portion 21 does not project toward one side in the axial direction from the side surface 59 of the inner ring 2. Therefore, lubricating oil that has flowed toward the outer side in the radial direction along the side surface 59 of the inner ring 2 can flow smoothly along the side surface 53 of the small annular portion 21 after flowing away from an end edge 59a of the side surface 59. If the inner peripheral side portion 51 (inner peripheral end 54) of the small annular portion 21 projected toward one side in the axial direction from the side surface 59 of the inner ring 2, lubricating oil that flowed along the side surface 59 of the inner ring 2 would collide against the inner peripheral surface of the inner peripheral side portion 51 and easily enter the bearing from a space between the inner ring 2 (small rib 14) and the small annular portion 21 after flowing away from the end edge 59a. With the embodiment, however, such entry can be prevented and, even if foreign matter is contained in lubricating oil, entry of such foreign matter into the inside of the bearing can be prevented.

As described above, lubricating oil that has flowed along the side surface 59 of the inner ring 2 and further flowed along the side surface 53 of the inner peripheral side portion 51 of the small annular portion 21 flows along a side surface 55 of the outer peripheral side portion 52 of the small annular portion 21. The side surface 55 is a diameter expanding surface, the diameter of which is expanded toward one side in the axial direction. An outer peripheral end 56 of the side surface 55 has an angular shape, and is positioned on one side in the axial direction with respect to a side surface 58 on one side, in the axial direction, of the outer ring 3. Therefore, when lubricating oil that has flowed along the side surface 55 of the small annular portion 21 flows away from the outer peripheral end 56, the lubricating oil flows in the direction away from the outer ring 3. As a result, it is not easy for the lubricating oil which has flowed away from the outer peripheral end 56 and foreign matter contained in the lubricating oil to enter a space between the outer ring 3 and the small annular portion 21.

From the above, with the tapered roller bearing 10 configured as described above, it is not easy for foreign matter such as metal powder to enter the inside of the bearing (annular space 7), in which the tapered rollers 4 are present, together with lubricating oil that is present on the outer side on one side in the axial direction and the outer side on the other side in the axial direction. Therefore, foreign matter can be prevented from being caught between the inner ring 2 or the outer ring 3 and the tapered rollers 4, improving the life of the tapered roller bearing 10.

Figure 5:
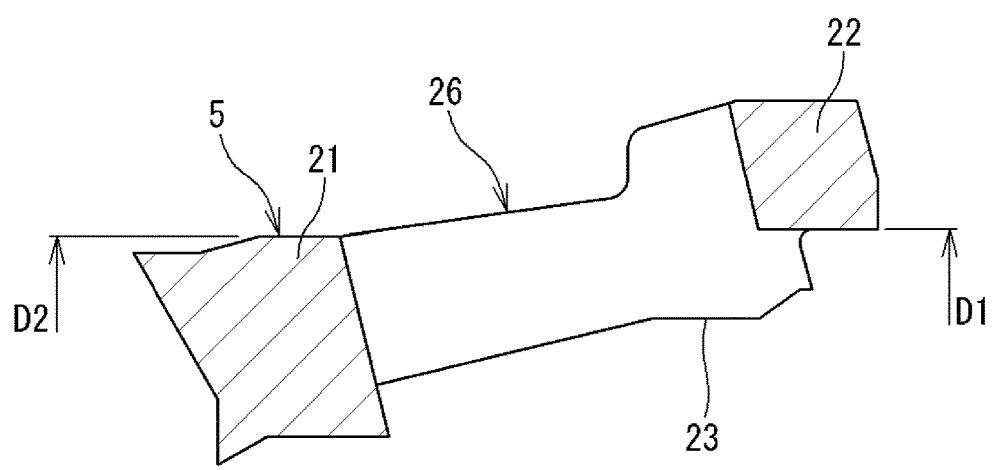
FIG. 5 is a sectional view of the cage.
Figure 6:
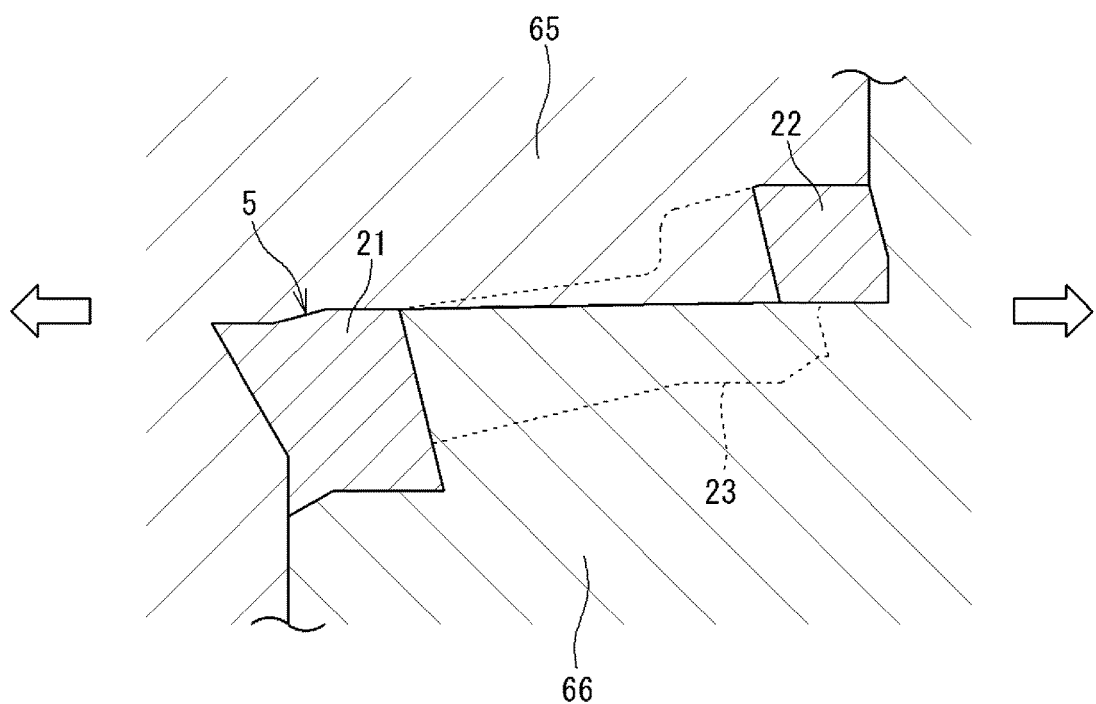
FIG. 6 is a sectional view illustrating a mold for molding the cage.

Manufacture of the cage 5 will be described. FIG. 5 is a sectional view of the cage 5. As described above, the cage 5 according to the embodiment is made of a thermoplastic resin, and manufactured by injection molding. Only split molds 65 and 66 (see FIG. 6) that are separable in the axial direction are used as a mold for the injection molding. Therefore, in the cage 5, as illustrated in FIG. 5, a minimum inside diameter D1 of the large annular portion 22 is larger than a maximum outside diameter D2 of the small annular portion 21 (D1>D2). With this configuration, the work of releasing the cage 5 which has been fabricated by injection molding from the mold (split molds 65 and 66) is facilitated, which is suitable for mass production of the cage 5. In the case where the minimum inside diameter D1 of the large annular portion 22 is smaller than the maximum outside diameter D2 of the small annular portion 21 (D1<D2), although not illustrated, unlike the embodiment illustrated in FIG. 5, split molds that are separable in the axial direction cannot be adopted. Therefore, a partial mold that is movable in the radial direction is further required in order to form the pockets 26 for accommodating the tapered rollers, which complicates the mold configuration.

The embodiment disclosed above is exemplary in all respects, and not limiting. That is, the tapered roller bearing according to the present invention is not limited to the illustrated embodiment, and may be in other embodiments without departing from the scope of the present invention. In the embodiment, the tapered roller bearing 10 is described as being used in a power transfer device for transmission devices etc. However, the tapered roller bearing 10 may be used in other rotary machines.

When the tapered roller bearing according to the present invention is rotated, an oil curtain is formed with lubricating oil flowing in the circumferential direction between the large annular portion of the cage and the large rib of the inner ring. It is possible for the oil curtain to suppress entry of foreign matter into the inside of the bearing from a space between the large annular portion and the large rib. As a result, foreign matter can be prevented from being caught between the inner ring or the outer ring and the tapered rollers, improving the life of the tapered roller bearing.

What is claimed is:

1. A tapered roller bearing comprising:
   an inner ring that has a conical inner raceway surface provided on an outer peripheral side of the inner ring and expanded in diameter from one side in an axial direction toward the other side and a large rib provided on the other side in the axial direction to project toward an outer side in a radial direction;
   an outer ring that has a conical outer raceway surface provided on an inner peripheral side of the outer ring and expanded in diameter from one side in the axial direction toward the other side;
   a plurality of tapered rollers provided between the inner ring and the outer ring to roll on the inner raceway surface and the outer raceway surface; and
   an annular cage that holds the plurality of tapered rollers, wherein:
   the cage has a small annular portion positioned on one side, in the axial direction, of the tapered rollers, a large annular portion positioned on the other side, in the axial direction, of the tapered rollers, and a plurality of cage bars that couple the small annular portion and the large annular portion to each other;
   the cage bars each have a cage bar end portion that is positioned between the large annular portion and the large rib and that projects toward the other side in the axial direction with respect to large end surfaces of the tapered rollers; and
   the cage bar end portion extends from the large end surface of the tapered roller toward the other side in the axial direction by a distance that is less than a distance from the large end surface of the tapered roller to an axial end surface of the large annular portion.

2. The tapered roller bearing according to claim 1, wherein
   a minute gap is formed between the cage bar end portion and the large rib.

3. The tapered roller bearing according to claim 2, wherein
   the large rib has a rib surface, a convex curved surface portion that is continuous with the outer side, in the radial direction, of the rib surface, and an outer peripheral surface connected to the convex curved surface portion, the cage bar end portion has a facing surface provided on an inner side, in the radial direction, of the cage bar end portion, the facing surface has an inclined surface that faces the convex curved surface portion and a cylindrical surface that is connected to the inclined surface at a bending angle and that faces a part of the outer peripheral surface, a first minute gap is formed between the convex curved surface portion and the inclined surface, and a second minute gap is formed between the cylindrical surface and the part of the outer peripheral surface.

4. The tapered roller bearing according to claim 1, wherein a minute gap is formed between the large annular portion and the outer ring.

5. The tapered roller bearing according to claim 1, wherein a minute gap is formed between each of the inner ring and the outer ring and the small annular portion.

6. The tapered roller bearing according to claim 1, wherein the cage is made of a thermoplastic resin, and a minimum inside diameter of the large annular portion is larger than a maximum outside diameter of the small annular portion.

* * * * *